United States Patent
Eilebrecht et al.

(10) Patent No.: US 11,100,109 B2
(45) Date of Patent: Aug. 24, 2021

(54) QUERYING DATA IN A DISTRIBUTED STORAGE SYSTEM

(71) Applicant: Microsoft Technology Licensing, LLC, Redmond, WA (US)

(72) Inventors: Eric Eilebrecht, Bothell, WA (US); Karthick Krishnamoorthy, Sammamish, WA (US); Maneesh Sah, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

(21) Appl. No.: 16/506,877

(22) Filed: Jul. 9, 2019

(65) Prior Publication Data

US 2020/0349166 A1    Nov. 5, 2020

Related U.S. Application Data (60) Provisional application No. 62/843,163, filed on May 3, 2019.

(51) Int. Cl.
  *G06F 16/24*      (2019.01)
  *G06F 16/2455*    (2019.01)
  (Continued)

(52) U.S. Cl.
  CPC ...... *G06F 16/24561* (2019.01); *G06F 16/248* (2019.01); *G06F 16/252* (2019.01)

(58) Field of Classification Search
  None
  See application file for complete search history.

(56) References Cited

U.S. PATENT DOCUMENTS

| 6,032,143 A | 2/2000 | Leung et al. |
| 7,984,043 B1 | 7/2011 | Waas |

(Continued)

FOREIGN PATENT DOCUMENTS

CN    102906751 A    1/2013

OTHER PUBLICATIONS

"1 Introducing Oracle Big Data SQL", Retrieved From: https://web.archive.org/web/20170619172554/https:/docs.oracle.com/bigdata/bds31/BDSUG/concepts.htm, Jun. 19, 2017, 6 Pages.
(Continued)

*Primary Examiner* — Son T Hoang
(74) *Attorney, Agent, or Firm* — Alleman Hall Creasman & Tuttle LLP (57) ABSTRACT

One example provides, at a front-end node of a distributed storage system, a method comprising receiving a query regarding data stored in an object, obtaining information identifying data nodes at which blocks of the object are stored, sending, to a first data node, a query regarding data in a first block, and receiving results for the query regarding the data in the first block comprising an incomplete record. The method further comprises sending, to a second data node, a query regarding data in a second block comprising the incomplete record, the second block being stored on a different physical device than the first block, and receiving results for the query regarding the data in the second block. The method further comprises outputting the results for the queries regarding the data in the first block and the data in the second block.

17 Claims, 5 Drawing Sheets

(51) Int. Cl.
*G06F 16/248* (2019.01)
*G06F 16/25* (2019.01)

(56) References Cited

U.S. PATENT DOCUMENTS

| | | | |
|---|---|---|---|
| 8,935,281 B1* | 1/2015 | Kale | G06F 16/148 |
| 9,514,007 B2 | 12/2016 | Gupta et al. | |
| 9,898,490 B2 | 2/2018 | Panchaksharaiah et al. | |
| 2007/0203925 A1 | 8/2007 | Sandler et al. | |
| 2015/0052109 A1 | 2/2015 | Word | |
| 2015/0302063 A1* | 10/2015 | Nigam | G06F 16/2471 |
| | | | 707/770 |
| 2017/0011090 A1 | 1/2017 | Chen et al. | |
| 2017/0091217 A1 | 3/2017 | Abrashkevich et al. | |
| 2017/0139991 A1* | 5/2017 | Teletia | G06F 16/9024 |
| 2018/0046663 A1* | 2/2018 | Guzman | G06F 16/2379 |
| 2018/0205672 A1* | 7/2018 | Dong | G06F 16/254 |
| 2018/0260392 A1* | 9/2018 | Li | G06F 16/1827 |

OTHER PUBLICATIONS

"Working with Parallel Query for Amazon Aurora MySQL", Retrieved From: https://docs.aws.amazon.com/AmazonRDS/latest/AuroraUserGuide/aurora-mysql-parallel-query.html, Oct. 31, 2014, 33 Pages.

"International Search Report and Written Opinion Issued in PCT Application No. PCT/US2020/026795", dated Jul. 10, 2020, 11 Pages.

* cited by examiner

QUERYING DATA IN A DISTRIBUTED STORAGE SYSTEM

CROSS REFERENCE TO RELATED APPLICATIONS

This application claims priority to U.S. Provisional Patent Application Ser. No. 62/843,163, filed May 3, 2019, the entirety of which is hereby incorporated herein by reference for all purposes.

BACKGROUND

Increasing volumes of data are being stored in network-accessible distributed storage systems, which may be referred to as cloud storage.

SUMMARY

Examples are disclosed that relate to querying data in a distributed storage system. One example provides, at a front-end node, a method comprising receiving a query regarding data stored in an object, obtaining information identifying data nodes at which blocks of the object are stored, sending, to a first data node, a query regarding data in a first block, and receiving results for the query regarding the data in the first block, the results comprising an incomplete record. The method further comprises sending, to a second data node, a query regarding data in a second block, the query comprising the incomplete record and the second block being stored on a different physical device than the first block, and receiving results for the query regarding the data in the second block. The method further comprises outputting the results for the queries regarding the data in the first block and the data in the second block.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A cloud storage system may allow users to store a wide variety of data types. Some types of data stored as binary objects (such as a binary large object, or blob) may comprise records in the form of semi-structured data, such as comma-separated value (CSV) data. A user of a cloud storage system may wish to run queries on blob data containing records to identify records of interest. However, efficiently running queries on such data may pose challenges. For example, a blob may be stored as many separate blocks of data distributed across multiple storage devices, which may be located in different physical locations. Further, the cloud storage system may split the blob into blocks without alignment of record or field boundaries, and also may be unaware of the type of data being stored and how to properly align block boundaries to fields and records.

One possible method of executing queries on such blob data is to transfer all blocks to a common location in a cloud storage system (e.g. a front-end node). Another method is to transfer the blob to a client in response to the query. However, these methods may consume significant network bandwidth for large objects, and much of this bandwidth usage may be unnecessary where the query comprises a predicate. A predicate may specify an attribute, property, or other aspect of data stipulating that data satisfying the predicate should be returned, whereas data not satisfying the predicate should not be returned. Where the blob data is transferred from various data storage nodes to the front-end node for execution of the query, the front-end node filters the data, via compute resources in the front-end, and returns to the client relevant portions of data that satisfy the predicate without returning irrelevant portions. Thus, irrelevant portions transferred from the data nodes to the front-end node utilize unnecessary bandwidth. Further, the front-end node or client also may utilize compute resources in formatting the data from the received blob data (e.g. by parsing the data to determine the delineations between fields/records, by building tables, etc.), which may contribute further to inefficiencies in running the query.

In view of the above, examples are disclosed that provide for the filtration of data at the data nodes of a storage layer in a distributed storage system. A front-end node of the distributed storage system may receive a query regarding data stored in a blob and obtain information identifying data nodes where blocks of the blob are stored. The query may include one or more predicates. The front-end node may query a first data node, where a first block of the blob is stored. The first data node may execute the query on the relevant block or blocks at that data node, and return results including records in the blocks that satisfy the predicate(s) without returning other records that do not satisfy the predicate(s). The front-end node may then output the results from the data nodes—e.g. to a client device that issued the original query to the front-end node. Accordingly, compute and network resources that would otherwise be consumed were unfiltered data sent to layers higher than the storage layer for filtration can be saved. Examples are also disclosed that provide logic at the data nodes for natively parsing and filtering structured and semi-structured data, alleviating the processing of such data at higher layers within or outside of the distributed storage system. Further, mechanisms are disclosed for returning records that span different storage devices and/or data nodes.

Figure 1:
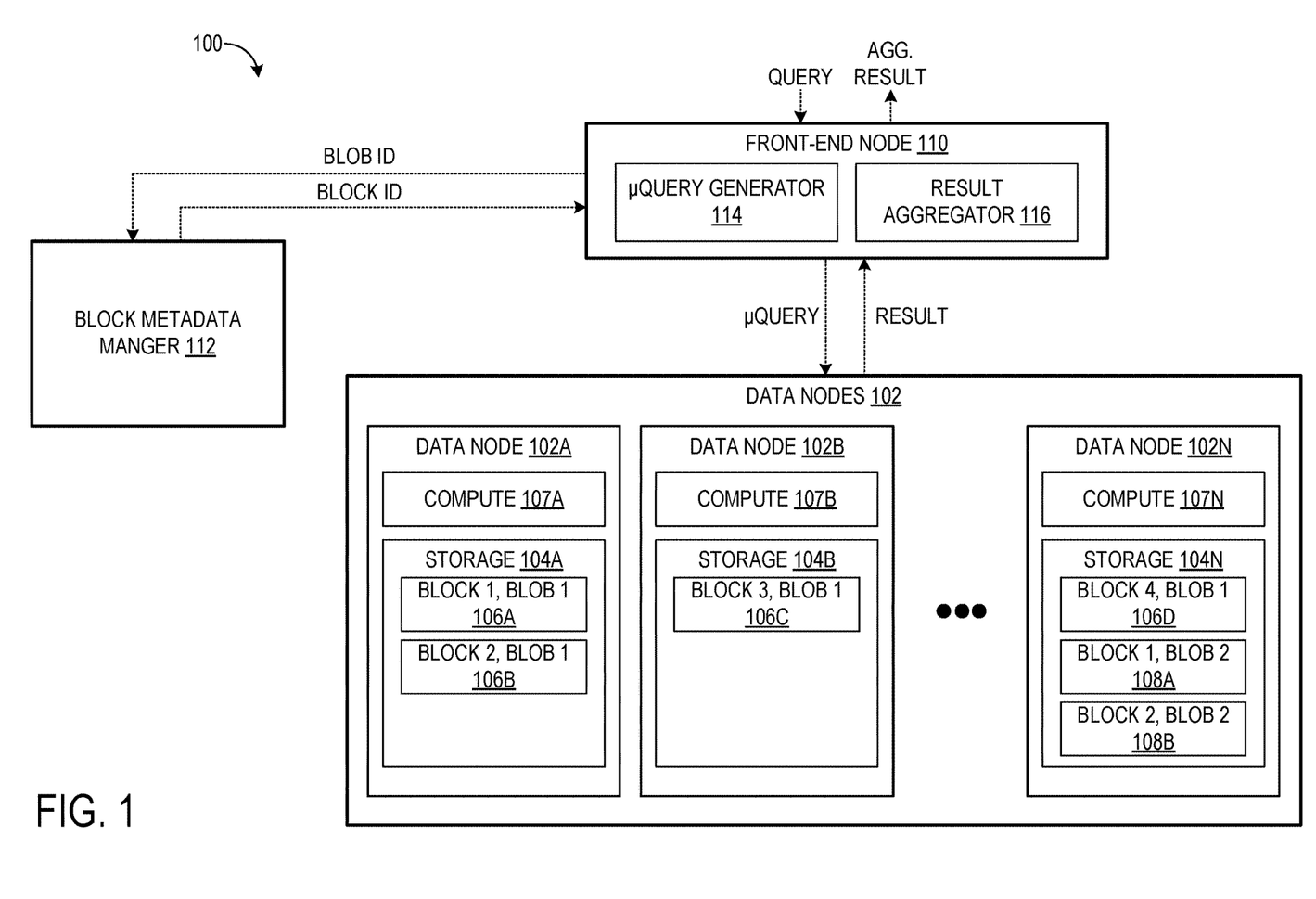
FIG. 1 schematically depicts an example distributed storage system.

FIG. 1 schematically depicts an example distributed storage system 100 including a plurality of data nodes 102. Each data node 102 includes compute resources (e.g. one or more logic devices such as a processor) and storage resources (e.g. one or more storage devices such as a hard drive or any other suitable storage medium). Data nodes 102 may include any other suitable computing hardware (e.g. network devices for communicating with other components of distributed storage system 100). Example computing devices are described in more detail below with reference to FIG. 5.

In the depicted example, each data node 102 stores data in the form of blobs. Each blob comprises one or more blocks, where the blocks of a blob may be stored at different storage devices of a data node and/or at different data nodes. Blocks may be distributed in this way for redundancy, balancing data storage, adapting to user demand, and/or for any other suitable purpose. In the example depicted in FIG. 1, local storage 104A of a first data node 102A stores a first block 106A and a second block 106B of a first blob, local storage 104B of a second data node 102B stores a third block 106C of the first blob, and local storage 104N of an Nth data node 102N stores a fourth block 106D of the first blob. Local storage 104N of Nth data node 102N also stores a first block 108A and a second block 108B that comprise a second blob. The storage 104 of data nodes 102, and compute resources implemented by the data nodes described below, may comprise a storage layer of distributed storage system 100.

Distributed storage system 100 further includes a front-end node 110 configured to receive queries for data stored at the data nodes 102. A client may issue a query to front-end node 110 via a public API, for example, or via any other suitable mechanism, wherein the client may be a device external to distributed storage system 100, or a service internal to the distributed storage system. A query may specify one or more blobs for which data is requested. To determine which data node(s) 102 at which blocks of a specified blob are stored, front-end node 110 sends information identifying the blobs to a block metadata manager (BMM) 112, which responds to the front-end node with information identifying the data node(s) where the blocks are stored.

Each data node 102 identified as storing a block of the specified blob is queried for data in that block. To query each data node, a microquery generator 114 of front-end node 110 generates a microquery for each block of the blob in an identified data node 102. For example with reference to first data node 102A, microquery generator 114 generates a first microquery regarding data in first block 106A of the first blob, and a second microquery regarding data in second block 106B of the first blob. First data node 102A then executes each microquery by parsing data in the block identified by the microquery. Each data node 102 comprises local compute resources 107 with which microqueries may be executed on blocks in that data node, such that the data in the data node is not sent across a network connection for filtering. For example, data node 102A comprises local compute resources 107A operable to execute microqueries on blocks in local storage 104A. Local compute resources 107 may be implemented in any suitable manner. For example, local compute resources 107A may comprise one or more processors communicatively coupled to the storage device(s) in local storage 104A via a suitable link (e.g. a Peripheral Component Interconnect Express (PCIe) bus, Serial AT Attachment (SATA) bus). Thus, a logic machine of local compute resources 107A may be connected to a hardware device on which local storage 104A is located. In some examples, the processor(s) may be located in physical proximity to the storage device(s)—e.g. in a common rack. Alternatively or additionally, local compute resources 107A with which microqueries are executed may be implemented in logic provided at the storage device(s) in local storage 104A. Where the storage device(s) comprise hard drives, for example, the logic may be implemented in controllers of the hard drives.

Each microquery generated by microquery generator 114 may specify one or more predicates. Accordingly, a data node 102 may execute a microquery by parsing the corresponding block to identify data that satisfies the predicate(s) specified by the microquery. The results of this microquery—i.e., the data satisfying the predicate(s)—may be sent to front-end node 110, which may combine these results with other results obtained from executing microqueries on other blocks of the corresponding blob. To this end, front-end node 110 includes a result aggregator 116 configured to aggregate results from microqueries executed on different blocks and to provide the aggregated results to a client of distributed storage system 100.

Figure 2:
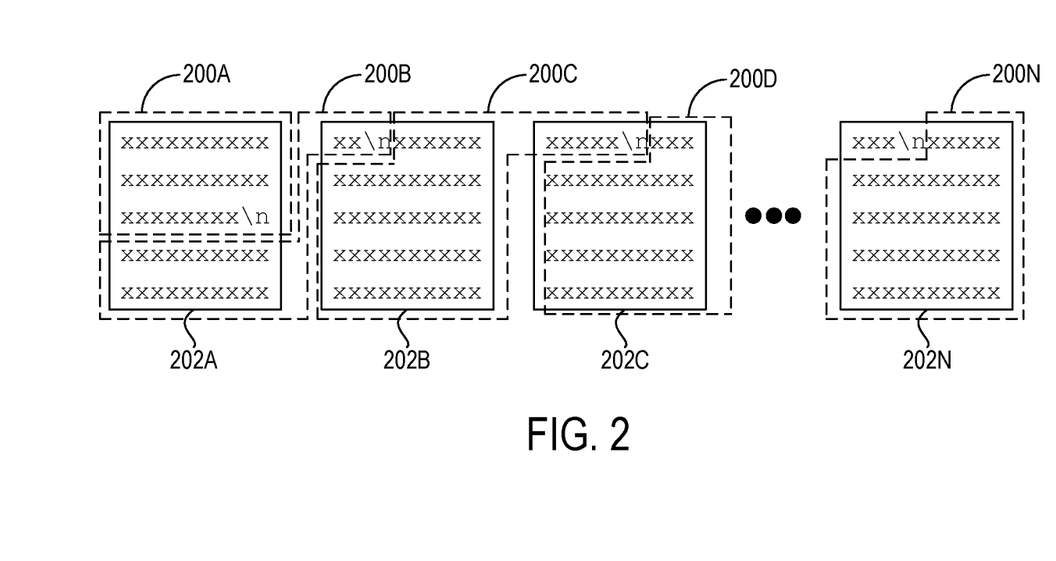
FIG. 2 depicts an example distribution of records stored as a binary object divided into multiple blocks.

In some instances, a record that is within a blob for which a query is executed may span multiple blocks. FIG. 2 depicts an example in which some records span different blocks, while others are fully contained within a single block. In particular, a first record 200A is contained within a first block 202A, while a second record 200B spans first block 202A and a second block 202B. A third record 200C spans second block 202B and a third block 202C. Blocks 202C and 202N also comprise partial records respectively at 200D and 200N. In this example, the records are of the CSV format, where boundaries between different records are delimited by newline characters (\n) that are not contained within quotation marks.

When a microquery is executed on a block comprising a partial record, filtered results on the complete records in the block may be returned (if any meet the relevant predicate(s)), along with a partial record at an end of the block. For example, the execution of a microquery on first block 202A may return complete first record 200A if it meets the predicate(s), and also return the portion of record 200B at the end of first block 202A whether or not it meets the predicate(s). Then, front-end node 110 may send, along with a microquery to second block 202B, the initial portion of second record 200B obtained from executing the previous microquery on the first block 202A. The incomplete portion may be prepended to second block 202B, and the microquery for the second block 202B may be executed on the second block 202B, including the now-complete record 200B.

While the example depicted in FIG. 2 is presented in the context of CSV data, blob data may assume any suitable form, including but not limited to tab-separated values (TSV), JavaScript Object Notation (JSON) data, and/or unstructured binary data. In some examples, the contents of a given blob may comprise multiple different data types. Further, any suitable type of query with any suitable predicate(s) may be issued to front-end node 110 to generate microqueries for blocks in data nodes 102. For example, SQL queries may be issued to front-end node 110. As a particular example, an SQL query comprising a select clause (e.g. specifying one or more columns in blob data to return), and a predicate in the form a where clause (e.g. specifying records in which the value of one column is greater than that of another column) may be issued to front-end node 110. In this way, queries typically executed on structured databases may instead be executed on blobs comprising semi-structured data. This may enable a client of distributed storage system 100 to forego importing entire blobs, creating a local database, and running local queries. Examples are also contemplated in which queries are run on blobs comprising structured data (e.g. data of the Apache Parquet format).

In some examples, a client may receive an input of a single query regarding data in a first blob and a second blob, and generate a first subquery for the first blob and a second subquery for the second blob. The first and second subqueries may be sent to front-end node 110, which generates block-level microqueries for each subquery based on the subqueries as described above. The client device may join the results received from front-end node 110 resulting from execution of the subqueries to provide aggregated results fulfilling the original single query.

Figure 3:
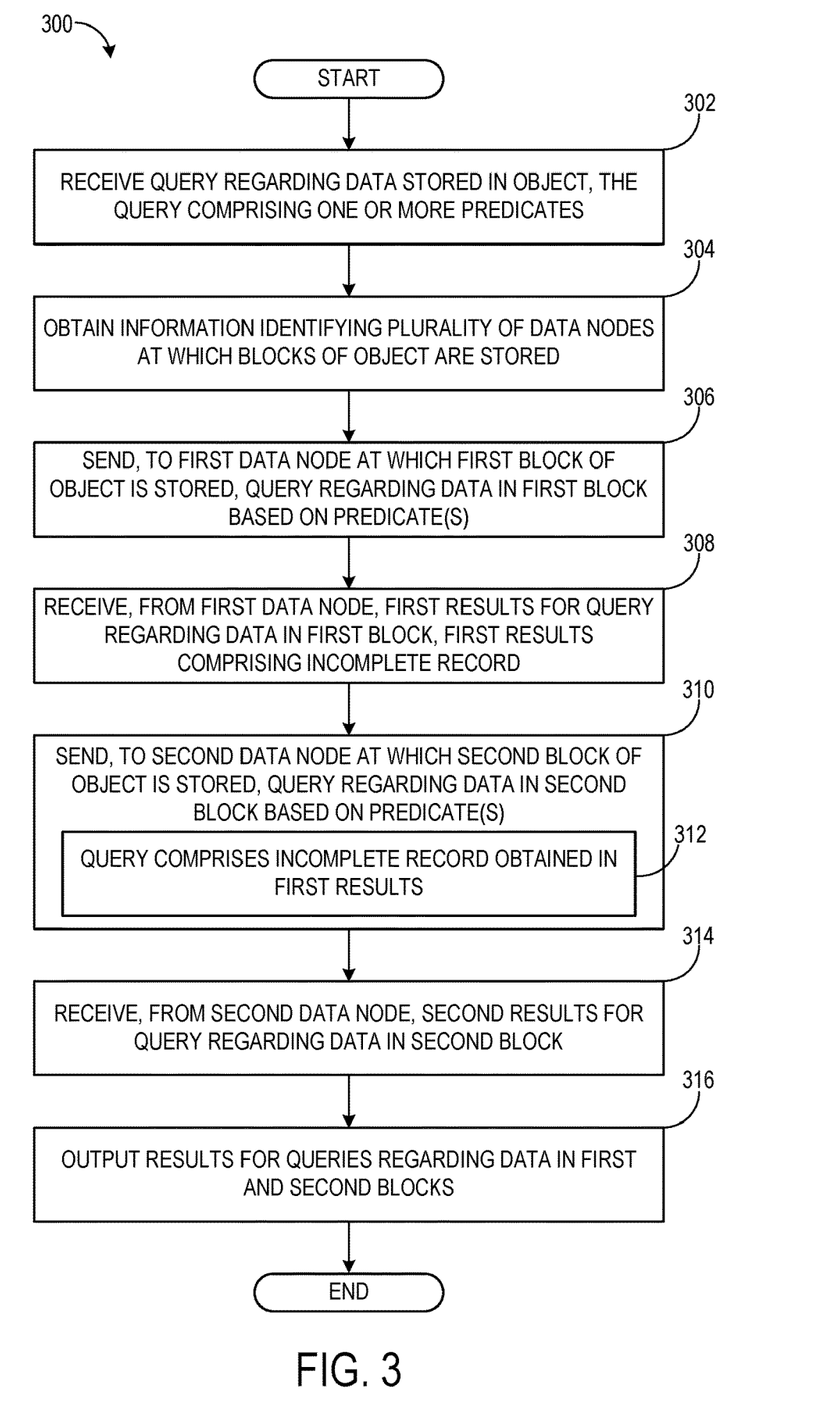
FIG. 3 shows a flowchart illustrating an example method of querying binary object data stored in a distributed storage system.

FIG. 3 shows a flowchart illustrating an example method 300 of querying data stored in an object (e.g. blob) in a distributed storage system. Method 300 may be executed at front-end node 110 of FIG. 1, for example.

At 302, method 300 comprises receiving a query regarding data stored in the object, the query comprising one or more predicates. At 304, method 300 comprises obtaining information identifying a plurality of data nodes at which blocks of the object are stored. The information may be obtained from BMM 112, for example.

At 306, method 300 comprises sending, to a first data node at which a first block of the object is stored, a query regarding data in the first block based upon the one or more predicates. The query may comprise a microquery (e.g. generated by microquery generator 114) directed to the first block. At 308, method 300 comprises receiving, from the first data node, first results for the query regarding the data in the first block. The first results comprise an incomplete record.

At 310, method 300 comprises sending, to a second data node at which a second block of the object is stored, a query regarding data in the second block based upon the one or more predicates, the second block being stored on a different physical device than the first block. The query may comprise a microquery (e.g. generated by microquery generator 114) directed to the second block. Where the first results for the query regarding the data in the first block comprise an incomplete record, the query regarding the data in the second block may comprise 312 the incomplete record (such that the incomplete record may be prepended to the second block, and the second block including the now-complete record may be parsed in executing the query on the second block).

At 314, method 300 comprises receiving, from the second data node, results for the query regarding the data in the second block. At 316, method 300 comprises outputting the first and second results for the queries regarding the data in the first block and the data in the second block. The first and second results for the queries regarding the data in the first and second blocks may be aggregated (e.g. via result aggregator 116) to output aggregated results. In some examples, the results may include a complete record formed by aggregating incomplete portions of the record obtained from different blocks, where the complete record satisfies the one or more predicates specified by the query received at 302.

Figure 4:
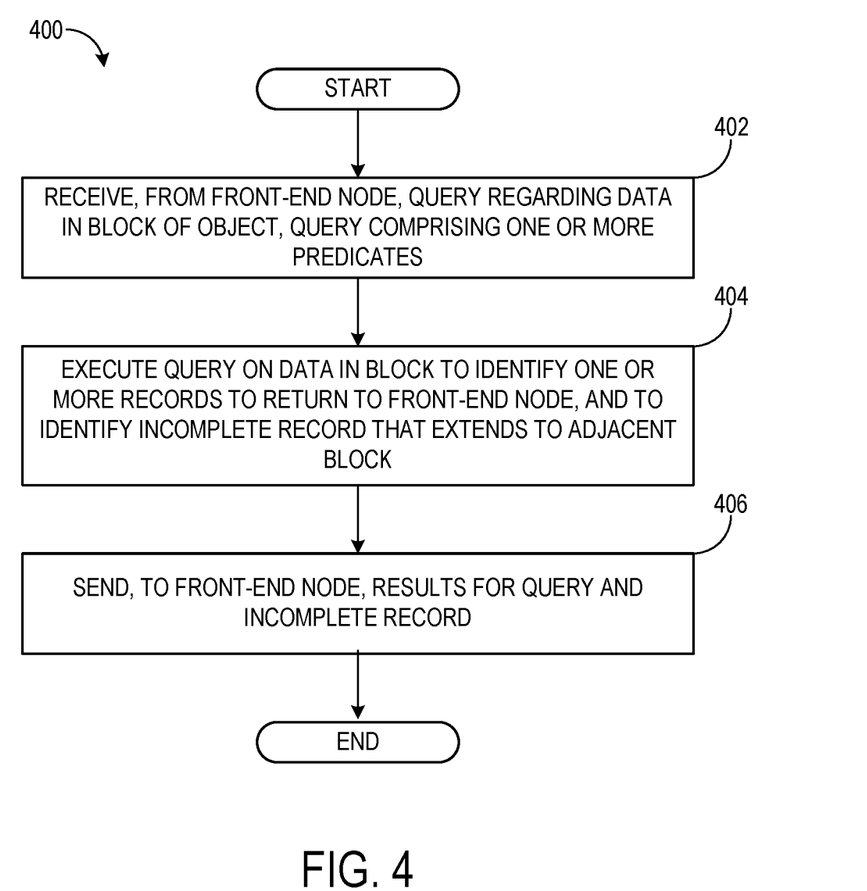
FIG. 4 shows a flowchart illustrating a method of executing a query at a data node in a distributed storage system.

FIG. 4 shows a flowchart illustrating a method 400 of executing a query at a data node in a distributed storage system. Method 400 may be executed at data node 102A, for example.

At 402, method 400 comprises receiving, from a front-end node of the distributed storage system, a query regarding data in a block of an object stored at local storage of the data node, the query comprising one or more predicates. In some examples, the query may comprise a partial record to be prepended to the block. At 404, method 400 comprises executing the query on the data in the block to identify one or more records to return to the front-end node, and to identify an incomplete record that extends to an adjacent block. At 406, method 400 comprises sending, to the front-end node, results for the query and the incomplete record.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
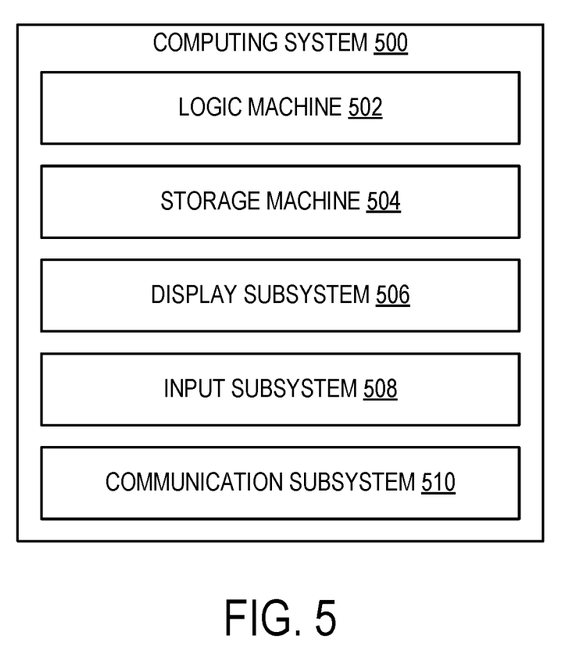
FIG. 5 shows a block diagram of an example computing system.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g. smart phone), and/or other computing devices.

Computing system 500 includes a logic machine 502 and a storage machine 504. Computing system 500 may optionally include a display subsystem 506, input subsystem 508, communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g. to hold different data.

Storage machine 504 may include removable and/or built-in devices. Storage machine 504 may include optical memory (e.g. CD, DVD, HD-DVD, Blu-Ray Disc, etc.), semiconductor memory (e.g. RAM, EPROM, EEPROM, etc.), and/or magnetic memory (e.g. hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g. an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Another example provides at a front-end node of a distributed storage system, a method, comprising receiving a query regarding data stored in an object, the query comprising one or more predicates, obtaining information identifying a plurality of data nodes at which blocks of the object are stored, sending, to a first data node at which a first block of the object is stored, a query regarding data in the first block based upon the one or more predicates, receiving, from the first data node, first results for the query regarding the data in the first block, the first results comprising an incomplete record, sending, to a second data node at which a second block of the object is stored, a query regarding data in the second block based upon the one or more predicates, the query comprising the incomplete record, the second block being stored on a different physical device than the first block, receiving, from the second data node, second results for the query regarding the data in the second block, and outputting the first results and the second results for the queries regarding the data in the first block and the data in the second block. In such an example, the method may further comprise sending, to additional data nodes at which additional blocks of the object are stored, respective queries regarding data stored in the additional blocks, and receiving, from the additional data nodes, respective results for the respective queries regarding the data in the additional blocks. In such an example, the second results for the query regarding the data in the second block may comprise results from executing the query on a complete record formed by prepending the incomplete record to the data in the second block. In such an example, the first results and the second results alternatively or additionally may comprise a complete record formed from an incomplete record of the first block, and an incomplete record of a third block adjacent to the second block. In such an example, the query regarding data stored in the object may be received from a client device external to the distributed storage system, and the results for the queries regarding the data in the first block and the data in the second block may be output to the client device. In such an example, the query regarding data stored in the object alternatively may be received from a client internal to the distributed storage system, and the results for the queries regarding the data in the first block and the data in the second block may be output to the client. In such an example, the information identifying the plurality of data nodes at which the blocks of the object are stored may be received in response to sending information identifying the object to a block metadata manager. In such an example, the object may comprise a blob. In such an example, the object alternatively or additionally may comprise semi-structured data.

Another example provides a data node of a distributed storage system, comprising a logic machine, local storage, and memory comprising instructions executable by the logic machine to receive, from a front-end node, a query regarding data in a block of an object, the block being stored in the local storage, the query comprising one or more predicates, execute the query on the data in the block to identify one or more records to return to the front-end node, and to identify an incomplete record that extends to an adjacent block of the object, and send, to the front-end node, results for the query and the incomplete record. In such an example, the incomplete record may be a first incomplete record, wherein the query may alternatively or additionally comprise a second incomplete record from a prior data block, and the instructions may be alternatively or additionally executable to prepend the second incomplete record to the block of the object. In such an example, the logic machine may be located on a same hardware device as the local storage. In such an example, the logic machine alternatively or additionally may be located on a server that is connected to a hardware device on which the local storage is located.

Another example provides a front-end node of a distributed storage system, comprising a logic machine, and a storage machine comprising instructions executable by the logic machine to receive a query regarding data stored in an object, the query comprising one or more predicates, obtain information identifying a plurality of data nodes at which blocks of the object are stored, send, to a first data node at which a first block of the object is stored, a query regarding data in the first block based upon the one or more predicates, receive, from the first data node, first results for the query regarding the data in the first block, the first results comprising an incomplete record, send, to a second data node at which a second block of the object is stored, a query regarding data in the second block based upon the one or more predicates, the query comprising the incomplete record, the second block being stored on a different physical device than the first block, receive, from the second data node, results for the query regarding the data in the second block, and output the first results and the second results for the queries regarding the data in the first block and the data in the second block. In such an example, the instructions may be alternatively or additionally executable to send, to additional data nodes at which additional blocks of the object are stored, respective queries regarding data stored in the additional blocks, and receive, from the additional data nodes, respective results for the respective queries regarding the data in the additional blocks. In such an example, the second results for the query regarding the data in the second block may comprise results from executing the query on a complete record formed by prepending the incomplete record to the data in the second block. In such an example, the first results and the second results alternatively or additionally may comprise a complete record formed from an incomplete record of the first block, and an incomplete record of a third block adjacent to the second block. In such an example, the object may comprise semi-structured data. In such an example, the query regarding data stored in the object may be received from a client device external to the distributed storage system, and the results for the queries regarding the data in the first block and the data in the second block may be output to the client device. In such an example, the query regarding data stored in the object alternatively or additionally may be received from a client internal to the distributed storage system, and the results for the queries regarding the data in the first block and the data in the second block may be output to the client.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a distributed storage system comprising a front-end node and a plurality of data nodes, a method, comprising:

on the front-end node,
receiving a query regarding data stored in an object, the query comprising one or more predicates,
obtaining information identifying a plurality of data nodes at which blocks of the object are stored,
sending, to a first data node at which a first block of the object is stored, a query regarding data in the first block based upon the one or more predicates,
receiving, from the first data node, first results for the query regarding the data in the first block and also an incomplete record, and
sending, to a second data node at which a second block of the object is stored, a query regarding data in the second block based upon the one or more predicates, the query comprising the incomplete record, the second block being stored on a different physical device than the first block;

on the second data node,
prepending the incomplete record to the second block of the object to form a complete record,
executing the query on the data in the second block including the complete record, and
sending, to the front-end node, second results for the query regarding the data in the second block; and on the front-end node,
receiving, from the second data node, the second results for the query regarding the data in the second block, and
outputting the first results and the second results for the queries regarding the data in the first block and the data in the second block.

2. The method of claim 1, further comprising sending, to additional data nodes at which additional blocks of the object are stored, respective queries regarding data stored in the additional blocks, and receiving, from the additional data nodes, respective results for the respective queries regarding the data in the additional blocks.

3. The method of claim 1, wherein the first results and the second results comprise a complete record formed from the incomplete record of the first block, and an incomplete record of a third block adjacent to the second block.

4. The method of claim 1, wherein the query regarding data stored in the object is received from a client device external to the distributed storage system, and wherein the results for the queries regarding the data in the first block and the data in the second block are output to the client device.

5. The method of claim 1, wherein the query regarding data stored in the object is received from a client internal to the distributed storage system, and wherein the results for the queries regarding the data in the first block and the data in the second block are output to the client.

6. The method of claim 1, wherein the information identifying the plurality of data nodes at which the blocks of the object are stored is received in response to sending information identifying the object to a block metadata manager.

7. The method of claim 1, wherein the object comprises a blob.

8. The method of claim 1, wherein the object comprises semi-structured data.

9. A distributed storage system comprising a plurality of computing devices each comprising a processor and memory storing instructions executable by the processor, the distributed storage system comprising:

a plurality of data nodes including a first data node and a second data node; and a front-end node, wherein the system is configured to:
at the front-end node,
receive a query regarding data stored in an object, the query comprising one or more predicates,
obtain information identifying a plurality of data nodes at which blocks of the object are stored, the plurality of data nodes comprising the first data node and the second data node,
send, to the first data node, a query regarding data in a first block based upon the one or more predicates,
receive, from the first data node, first results for the query regarding the data in the first block and also an incomplete record, and
send, to the second data node at which a second block of the object is stored, a query regarding data in a second block based upon the one or more predicates, the query comprising the incomplete record, the second block being stored on a different physical device than the first block;
at the second data node,
prepend the incomplete record to the second block of the object to form a complete record,
execute the query on the data in the second block including the complete record, and
send, to the front-end node, second results for the query regarding the data in the second block; and
at the front-end node,
receive, from the second data node, the second results for the query regarding the data in the second block, and
output the first results and the second results for the queries.

10. The distributed storage system of claim 9, wherein a processor of the second data node is located on a same hardware device as local storage of the second data node.

11. The distributed storage system of claim 10, wherein a processor of the second data node is located on a server that is connected to a hardware device on which local storage of the second data node is located.

12. A distributed storage system comprising a plurality of computing devices each comprising a processor and memory storing instructions executable by the processor, the distributed storage system comprising:
a plurality of data nodes including a first data node and a second data node; and
a front-end node, wherein the distributed storage system is configured to:
at the front-end node,
receive a query regarding data stored in an object, the query comprising one or more predicates,
obtain, from a block metadata manager, information identifying each of a plurality of data nodes at which blocks of the object are stored,
send, to the first data node at which a first block of the object is stored, a query regarding data in the first block based upon the one or more predicates,
receive, from the first data node, first results for the query regarding the data in the first block and also an incomplete record, and
send, to the second data node at which a second block of the object is stored, a query regarding data in the second block based upon the one or more predicates, the query comprising the incomplete record, the second block being stored on a different physical device than the first block;
at the second data node,
prepend the incomplete record to the second block of the object to form a complete record,
execute the query on the data in the second block including the complete record, and
send, to the front-end node, second results for the query regarding the data in the second block; and
at the front-end node,
receive, from the second data node, the second results for the query regarding the data in the second block; and
output the first results and the second results for the queries regarding the data in the first block and the data in the second block.

13. The distributed storage system of claim 12, wherein the front-end node is further configured to send, to additional data nodes at which additional blocks of the object are stored, respective queries regarding data stored in the additional blocks, and receive, from the additional data nodes, respective results for the respective queries regarding the data in the additional blocks.

14. The distributed storage system of claim 12, wherein the first results and the second results comprise the complete record formed from the incomplete record of the first block, and an incomplete record of a third block adjacent to the second block.

15. The distributed storage system of claim 12, wherein the object comprises semi-structured data.

16. The distributed storage system of claim 12, wherein the query regarding data stored in the object is received from a client device external to the distributed storage system, and wherein the results for the queries regarding the data in the first block and the data in the second block are output to the client device.

17. The distributed storage system of claim 12, wherein the query regarding data stored in the object is received from a client internal to the distributed storage system, and wherein the results for the queries regarding the data in the first block and the data in the second block are output to the client.

* * * * *